(12) United States Patent
Kitazawa et al.

(10) Patent No.: US 12,122,085 B2
(45) Date of Patent: Oct. 22, 2024

(54) FORMING METHOD

(71) Applicant: MITSUBISHI HEAVY INDUSTRIES, LTD., Tokyo (JP)

(72) Inventors: Toshiki Kitazawa, Tokyo (JP); Masahiko Shimizu, Tokyo (JP); Shoya Mano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 157 days.

(21) Appl. No.: 17/636,234

(22) PCT Filed: Nov. 26, 2019

(86) PCT No.: PCT/JP2019/046163
§ 371 (c)(1),
(2) Date: Feb. 17, 2022

(87) PCT Pub. No.: WO2021/106074
PCT Pub. Date: Jun. 3, 2021

(65) Prior Publication Data
US 2022/0339853 A1    Oct. 27, 2022

(51) Int. Cl.
*B29C 53/04*    (2006.01)
*B29C 33/42*    (2006.01)
*B29C 70/38*    (2006.01)

(52) U.S. Cl.
CPC ............ *B29C 53/04* (2013.01); *B29C 33/42* (2013.01); *B29C 70/386* (2013.01)

(58) Field of Classification Search
None
See application file for complete search history.

(56) References Cited

U.S. PATENT DOCUMENTS 8,142,181 B2    3/2012  Willden et al.
9,272,767 B2 *  3/2016  Stewart .............. B29C 31/008
(Continued)

FOREIGN PATENT DOCUMENTS

EP    3034271 A1 *  6/2016  ............ B29C 53/02
JP    H06-071742 A    3/1994
(Continued)

OTHER PUBLICATIONS

European Patent Office "Extended European Search Report with Search Opinion for European Patent Application No. 19953854.7," Jun. 21, 2022.
(Continued)

*Primary Examiner* — Barbara J Musser
(74) *Attorney, Agent, or Firm* — HAUPTMAN HAM, LLP

(57) ABSTRACT

A forming method according to the present disclosure includes a laminating step for forming an intermediate formed article by supplying and laminating a fibrous sheet onto forming surfaces of a forming die for forming the intermediate formed article; and a bending process step for performing a bending process on the intermediate formed article, which is laminated on the forming surfaces and has a shape that corresponds to the forming die, to yield a formed article. The forming surfaces have shapes that correspond to the intermediate formed article to be formed. The second forming surface is bent with respect to the first forming surface among the forming surfaces, and the angle formed by the first forming surface and the second forming surface is greater than the bending angle of the cross-section of the formed article to be formed and less than 180 degrees.

3 Claims, 8 Drawing Sheets

(56) References Cited

U.S. PATENT DOCUMENTS

| | | |
|---|---|---|
| 9,782,958 B2 | 10/2017 | Cano Cediel et al. |
| 2013/0221568 A1 | 8/2013 | Shindo et al. |
| 2015/0053332 A1 | 2/2015 | Cano Cediel et al. |
| 2017/0291376 A1 | 10/2017 | Wadsworth |
| 2019/0275749 A1 | 9/2019 | Sekine et al. |

FOREIGN PATENT DOCUMENTS

| | | |
|---|---|---|
| JP | H07-47596 A | 2/1995 |
| JP | 2004-216697 A | 8/2004 |
| JP | 2019-151083 A | 9/2019 |
| WO | 2013/129075 A1 | 9/2013 |

OTHER PUBLICATIONS

Japan Patent Office "Office Action for Japanese Patent Application No. 2021-560800," Nov. 22, 2022.
PCT/ISA/210, "International Search Report for PCT International Application No. PCT/JP2019/046163," Feb. 25, 2020.
PCT/ISA/237, "Written Opinion for PCT International Application No. PCT/JP2019/046163," Feb. 25, 2020.

* cited by examiner

FORMING METHOD

RELATED APPLICATIONS

The present application is National Phase of International Application No. PCT/JP2019/046163 filed Nov. 26, 2019, the disclosure of which is hereby incorporated by reference herein in its entirety.

TECHNICAL FIELD

The present disclosure relates to a forming method and a forming die, and in particular, to a forming method and forming die for forming a fiber sheet that is a material of a composite material.

BACKGROUND ART

In some aircraft parts such as a fuselage and a main wing of an aircraft, a composite material, for example, a carbon fiber reinforced plastic (CFRP) is used, and CFRP structural members configuring the aircraft parts have any cross-sectional shape. When a formed article is formed by forming the CFRP, a fiber sheet laminate (also called a charge) in which fiber sheets (prepregs or the like) are laminated to be flat is formed by being bent so as to have an R-surface or being curved so as to have a gentle curvature. In this way, a formed article having any cross-sectional shape is formed.

Further, unlike the above method, there is a case where a formed article is formed by laminating fiber sheets on a forming die corresponding to the final shape of the formed article when laminating the fiber sheets. The following PTL 1 discloses a technique in which a composite material in which prepregs are laminated is formed by a forming die.

CITATION LIST

Patent Literature

[PTL 1] U.S. Pat. No. 8,142,181

SUMMARY OF INVENTION

Technical Problem

At the time of bending of a fiber sheet laminate, it is necessary to perform forming while causing layers (fiber sheets) of the fiber sheet laminate to appropriately slide with respect to one another. In a case where the layers do not appropriately slide with respect to one another, there is a concern that wrinkles may occur in a bending region. Further, in a case where the fiber sheet laminate is bent so as to have an R-surface in the vicinity of a bending line, a difference in peripheral length occurs in the fiber sheet laminate before and after the bending. Since the fiber sheet does not have stretchability in a fiber direction, there is a possibility that wrinkles may occur due to excess fibers during the bending.

In a case where fiber sheets are laminated using a lamination device, a tow or a tape that includes fibers is discharged in one direction from the lamination device and laminated. At this time, there is a restriction on the relationship between the shape of a formed article to be formed and an angle at which the tow or the tape can be laminated, according to the configuration of the lamination device. Therefore, since there is a limit to the angle at which the tow or the tape can be laminated, the fiber sheets cannot be laminated on a forming die corresponding to a final shape having a predetermined angle. For example, it is difficult to laminate the tow or the tape in the direction of 45 degrees with respect to a longitudinal direction on the inner surface side of an elongated member having an L-shaped cross section bent at 90 degrees. Further, even in the case of a recess cross section, the tow or the tape cannot be laminated.

Further, even in the case of a protrusion shape having a curvature, it is necessary to laminate a relatively narrow tow or tape in order to prevent the occurrence of wrinkles. Therefore, there is a problem in that a time required for the lamination becomes longer.

The present disclosure has been made in view of such circumstances, and has an object to provide a forming method and a forming die, in which it is possible to suppress the occurrence of wrinkles during bending and shorten a time required for lamination.

Solution to Problem

In order to solve the above problems, a forming method and a forming die of the present disclosure adopt the following means.

That is, a forming method according to the present disclosure includes: a laminating step of supplying and laminating fiber sheets on a forming surface of a forming die for forming an intermediate formed article to form the intermediate formed article; and a bending step of performing bending on the intermediate formed article, which is laminated on the forming surface and has a shape corresponding to the forming die, so as to obtain a formed article, in which the forming surface has a shape corresponding to the intermediate formed article to be formed, a second forming surface is bent with respect to a first forming surface in the forming surface, and an angle that is formed by the first forming surface and the second forming surface is larger than a bent angle of a cross-sectional shape of the formed article to be formed and is less than 180 degrees.

A forming die according to the present disclosure is a forming die for forming an intermediate formed article that is subjected to bending to be formed as a formed article, in which the forming die has a forming surface on which fiber sheets are supplied and laminated, the forming surface has a shape corresponding to the intermediate formed article to be formed, a second forming surface is bent with respect to a first forming surface in the forming surface, and an angle that is formed by the first forming surface and the second forming surface is larger than a bent angle of a cross-sectional shape of the formed article to be formed and is less than 180 degrees.

Advantageous Effects of Invention

According to the present disclosure, it is possible to suppress the occurrence of wrinkles during the bending and shorten a time required for lamination.

DESCRIPTION OF EMBODIMENTS

Hereinafter, an embodiment according to the present disclosure will be described with reference to the drawings.

In the present embodiment, first, an intermediate formed article 32, which is a fiber sheet laminate, is formed by laminating fiber sheets 30 while shaping them by using a lamination device 1, and a formed article 34 having a final shape is formed by further performing bending on the intermediate formed article 32. The formed article 34 is, for example, a stringer, a spar, a frame, a rib, or the like, which are aircraft parts configuring an aircraft structure. Further, the intermediate formed article 32 refers to a fiber sheet laminate having a shape before having a shape as the formed article 34 although it is formed by the lamination device 1.

Figure 1:
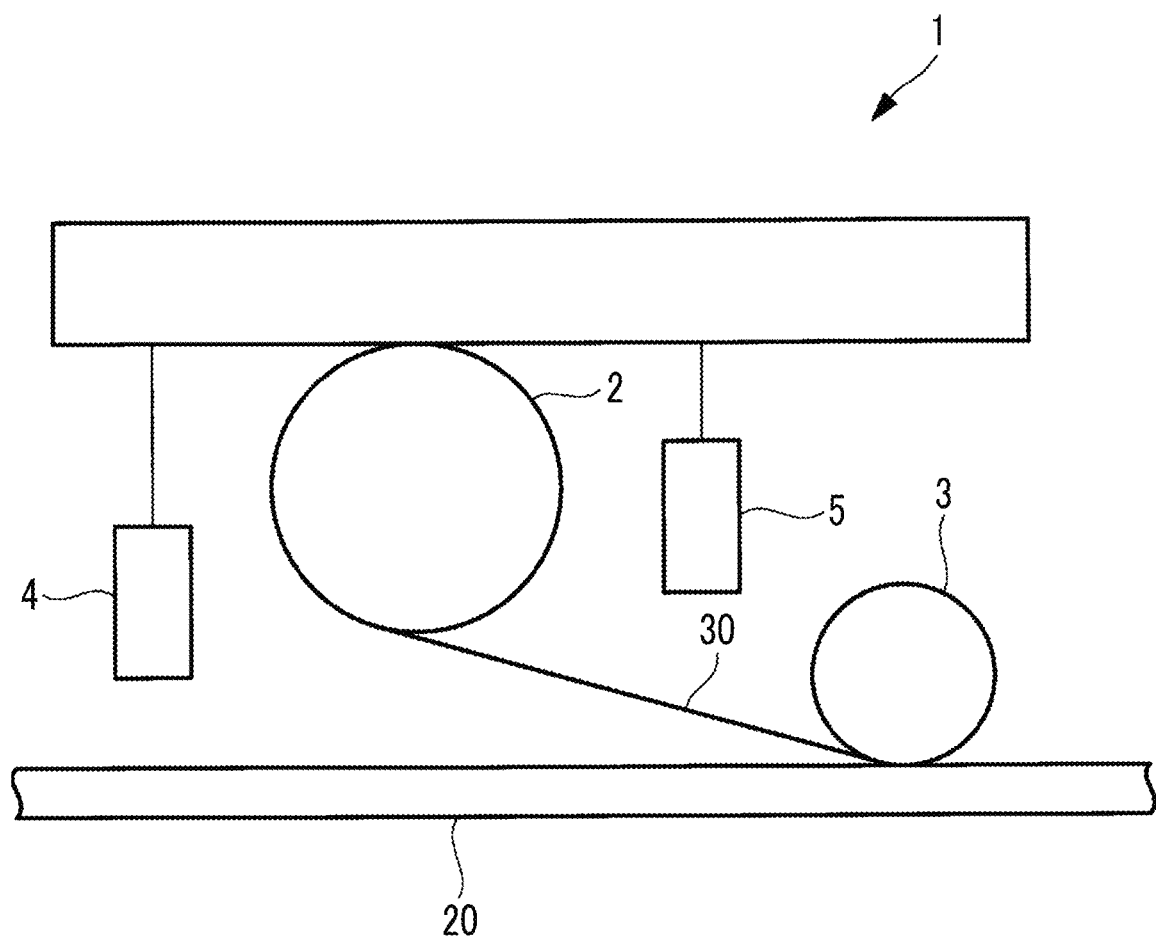
FIG. 1 is a schematic diagram showing a lamination device according to an embodiment of the present disclosure.

As shown in FIG. 1, the lamination device 1 that is used for a forming method according to the present embodiment includes a supply unit 2, a pressing unit 3, heating units 4 and 5, and the like. In the lamination device 1, a fiber sheet 30 such as a prepreg is supplied one layer at a time toward a forming die 20, and the fiber sheet 30 placed on the forming die 20 is pressed by using the pressing unit 3 to be shaped along the forming die 20. Next, another fiber sheet 30 is supplied and placed on the upper surface of the shaped fiber sheet 30, and is pressed and shaped by using the pressing unit 3. This operation is repeated layer by layer, so that a plurality of fiber sheets 30 are laminated on the forming die 20 to form a fiber sheet laminate having a target shape as the intermediate formed article 32.

The fiber sheet 30 has a tape shape that is long in one direction, is wound in a roll shape before being supplied, and is accommodated in the supply unit 2. The direction of each fiber in the fiber sheet 30 is disposed so as to be parallel to a longitudinal direction of the fiber sheet 30. The fiber sheet 30 wound in a roll shape is supplied from the supply unit 2. The fiber sheet 30 may or may not be infiltrated with synthetic resin, for example, thermoplastic resin or thermosetting resin.

The supply unit 2 discharges the fiber sheet 30 in one direction and supplies the fiber sheet 30 to the forming die 20. The supply unit 2 is configured to be movable along the longitudinal direction and the lateral direction of the forming die 20. In this case, the supply unit 2 supplies the fiber sheet 30 from one end side to the other end side in the longitudinal direction of the forming die 20 or from one end side to the other end side in the lateral direction while moving.

Figure 2A:
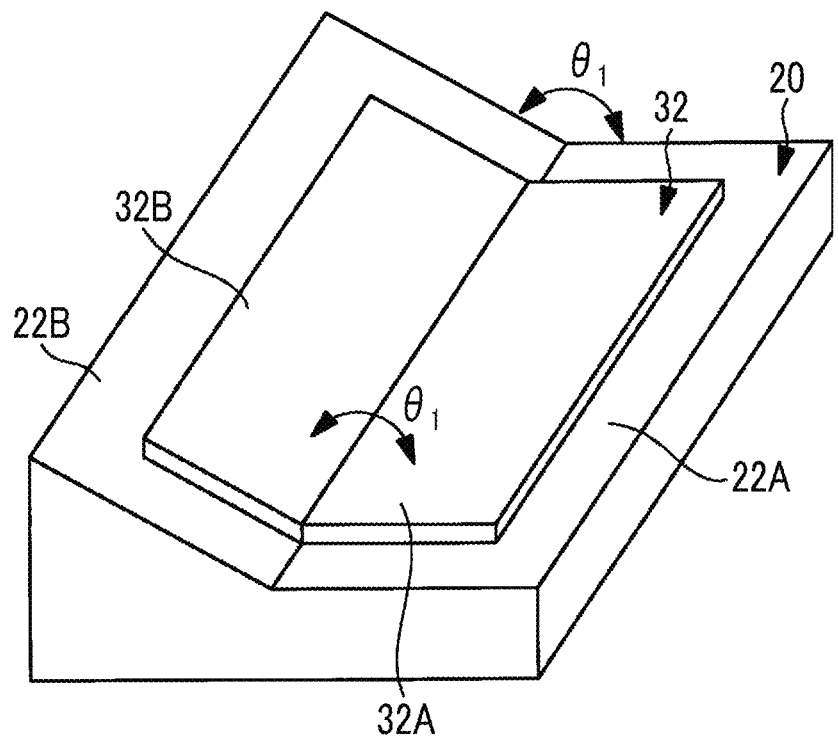
FIG. 2A is a perspective view showing a first example of a forming die according to the embodiment of the present disclosure.
Figure 3A:
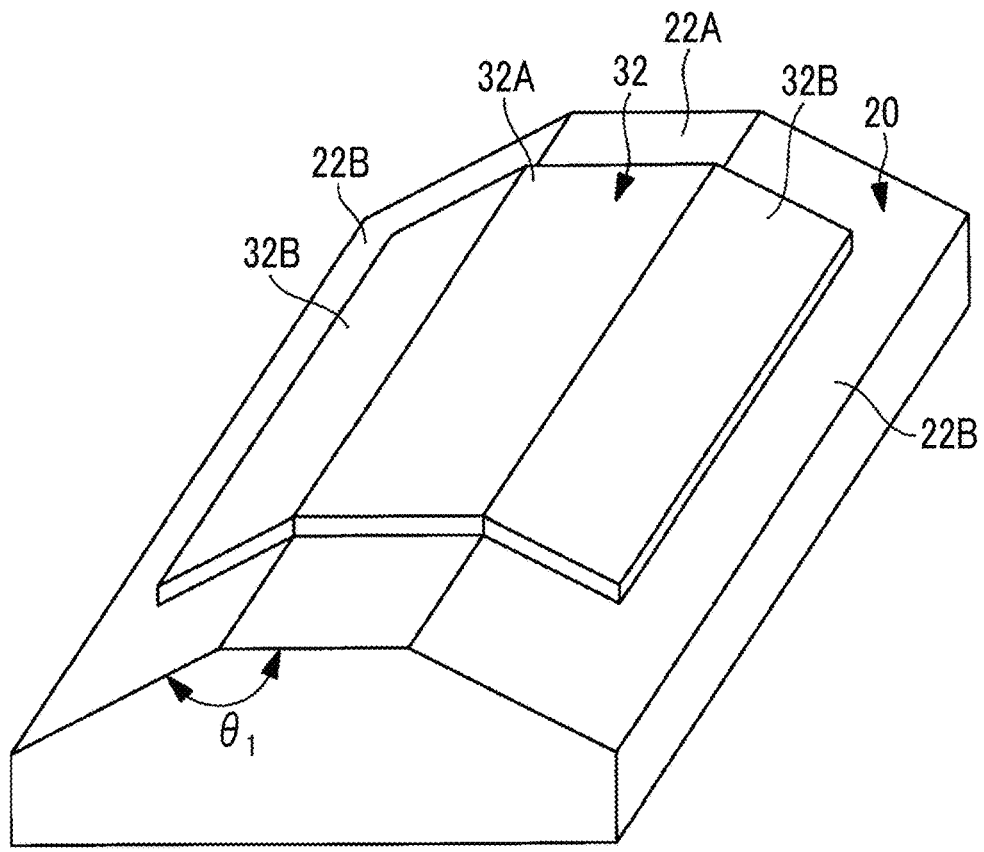
FIG. 3A is a perspective view showing a second example of the forming die according to the embodiment of the present disclosure.

The forming die 20 has an elongated shape that is long in one direction, for example, as shown in FIGS. 2A and 3A. There is a case where the forming die 20 has a constant cross-sectional shape along the longitudinal direction, has a cross-sectional shape that varies, or is formed with a twist or a contour, according to the shape of a laminate to be formed.

The fiber sheet 30 before forming is placed on the forming die 20, and thereafter, the fiber sheet 30 is pressed by the pressing unit 3 to be formed into a shape corresponding to the shape of the forming die 20.

Figure 2B:
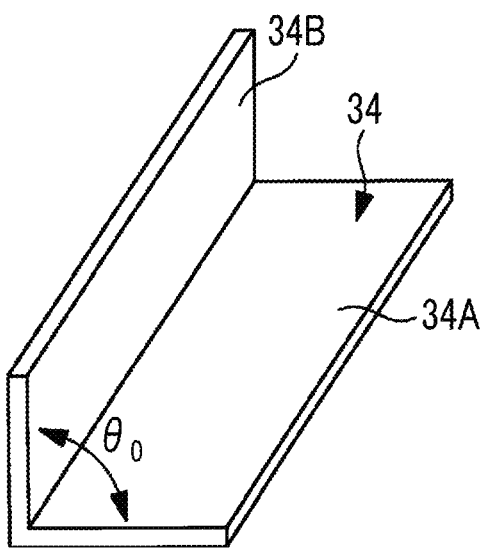
FIG. 2B is a perspective view showing a formed article that is formed by the first example of the forming die according to the embodiment of the present disclosure.
Figure 3B:
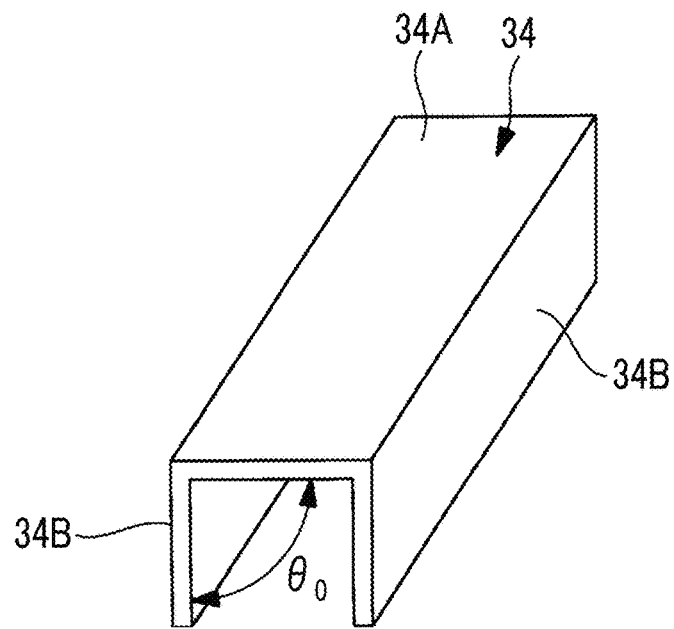
FIG. 3B is a perspective view showing a formed article that is formed by the second example of the forming die according to the embodiment of the present disclosure.

The forming die 20 has an angle $\theta_1$ that is closer to a flat plane than a bent angle $\theta_0$ of the cross-sectional shape of the formed article 34 to be formed. Here, a case will be described where the formed article 34 has a first plate portion 34A and a second plate portion 34B and the first plate portion 34A and the second plate portion 34B are connected to each other, as shown in FIGS. 2B and 3B, and the intermediate formed article 32 has a first plate portion 32A and a second plate portion 32B and the first plate portion 32A and the second plate portion 32B are connected to each other, as shown in FIGS. 2A and 3A. In this case, the bent angle $\theta_0$ of the cross-sectional shape of the formed article 34 is an angle that is formed by the plate surface of the first plate portion 34A and the plate surface of the second plate portion 34B (the formed angle is set to be less than 180 degrees). Further, the bent angle $\theta_1$ of the cross-sectional shape of the intermediate formed article 32 is an angle that is formed by the plate surface of the first plate portion 32A and the plate surface of the second plate portion 32B (the formed angle is set to be less than 180 degrees). Since the forming die 20 and the intermediate formed article 32 correspond to each other, they have the same bent angle $\theta_1$.

For example, in a case where an elongated member having an L-shaped cross section or a C-shaped cross section bent at 90 degrees, as shown in FIGS. 2B and 3B, is formed as the formed article 34, the bent angle $\theta_1$ of the cross-sectional shape of the intermediate formed article 32 is larger than the bent angle $\theta_0$ of the cross-sectional shape of the formed article 34 to be formed and is less than 180 degrees, as shown in FIGS. 2A and 3A. The intermediate formed article 32 has the bent angle $\theta_1$ larger than the bent angle $\theta_0$ (for example, 90 degrees) of the cross-sectional shape of the formed article 34.

Correspondingly, the shapes of forming surfaces 22A and 22B of the forming die 20 correspond to the intermediate formed article 32 to be formed. For example, in the forming die 20, the same angle as the bent angle $\theta_1$ of the cross-sectional shape of the intermediate formed article 32, that is, the angle that is formed by the forming surface 22A on one side and the forming surface 22B on the other side is also $\theta_1$. In a case where the angle $\theta_1$ that is formed by the forming surface 22A on one side and the forming surface 22B on the other side in the forming die 20 is, for example, 150 degrees or more, more preferably 160 degrees or more, the forming surfaces 22A and 22B of the forming die 20 become closer to a flat plane, and thus at the time of lamination of the fiber sheets 30, it is possible to laminate a wide tow or tape. The angle $\theta_1$ that is formed by the forming surface 22A on one side and the forming surface 22B on the other side in the forming die 20 is larger than the bent angle $\theta_0$ of the cross-sectional shape of the formed article 34 that is finally formed, and is less than 180 degrees. The forming surfaces 22A and 22B are examples of a first forming surface and a second forming surface according to the present disclosure, respectively.

The pressing unit 3 is, for example, a roller, and presses the fiber sheet 30 placed on the forming die 20 to shape the fiber sheet 30 along the forming die 20. The pressing unit 3 is driven so as to apply a predetermined pressing force to the forming die 20 or the fiber sheet 30. Further, the pressing unit 3 is movable along the longitudinal direction and the lateral direction of the forming die 20, and the pressing unit 3 presses the fiber sheet 30 while moving, so that the fiber sheet 30 having an elongated shape can be shaped over the range from one end to the other end, that is, can be fitted along the forming die 20.

The heating units 4 and 5 heat the fiber sheet 30 or the forming die 20. The heating units 4 and 5 heat an object by, for example, infrared rays, warm air, laser light, or the like.

The heating unit 4 is installed in front of the supply unit 2 in a moving direction and heats the forming die 20, the fiber sheet 30 before being placed on the forming die 20, or the fiber sheet 30 that has already been formed on the forming die 20. The heating unit 5 is installed behind the supply unit 2 in the moving direction and heats the fiber sheet 30 before being placed on the forming die 20. In this way, the fiber sheet 30 or the forming die 20 is heated before the fiber sheet 30 is placed on the forming die 20 or before the fiber sheet 30 is shaped by using the pressing unit 3. Since the adherence of the fiber sheets is improved due to a temperature rise, the adhesive property between the fiber sheets 30 is enhanced.

Further, a heating unit (not shown) may heat the pressing unit 3 from the outside. Alternatively, a heating unit (not shown) may be provided inside the pressing unit 3 to generate heat in the pressing unit 3. In this way, when the fiber sheet 30 is pressed by using the pressing unit 3, the pressing unit 3 is heated or the pressing unit 3 generates heat, so that the plasticity of the fiber sheet 30 is increased, and since the adherence of the fiber sheets is improved due to a temperature rise, the adhesive property between the fiber sheets 30 is enhanced.

A bending device (not shown) performs bending on the fiber sheet laminate as the formed intermediate formed article 32 so as to obtain the formed article 34 having a final shape. The bending device includes, for example, a forming die having a shape corresponding to the final shape, a roller for pressing the fiber sheet laminate, a heating unit that heats the fiber sheet laminate, and the like. Further, the bending device is not limited to a case where shaping is performed by a roller, and may have a configuration in which the fiber sheet laminate is covered with a bladder bag and pressed from the outside or the inside is evacuated for processing.

Next, the forming method for the fiber sheet 30 according to the present embodiment will be described.

First, the supply unit 2 discharges the fiber sheet 30 and supplies the fiber sheet 30 to the forming die 20. The supply unit 2 supplies the fiber sheet 30 while moving from one end side to the other end side of the forming die 20 in a predetermined direction. The fiber sheet 30 supplied from the supply unit 2 is placed on the forming die 20. Further, the pressing unit 3 presses the fiber sheet 30 while moving from one end side to the other end side of the forming die 20 together with the supply unit 2.

When the fiber sheet 30 is repeatedly supplied and pressed from one end side to the other end side over the entire predetermined region on the forming die 20, the forming of the fiber sheet 30 of a first layer is completed.

Next, the supply unit 2 and the pressing unit 3 supply and press the fiber sheet 30 on the already placed fiber sheet 30 while moving from one end side to the other end side of the forming die 20 in the direction different from or the same direction as that in the first layer. When the fiber sheet 30 is repeatedly supplied and pressed from one end side to the other end side over the entire predetermined region on the fiber sheet 30 of the first layer, the forming of the fiber sheet 30 of a second layer is completed.

When the operation described above is repeated and the required number of fiber sheets 30 are laminated and formed, the intermediate formed article 32 is formed, and the lamination and forming of the fiber sheets 30 are completed.

Next, the bending is performed on the fiber sheets 30 as the formed intermediate formed article 32 by the bending device so as to obtain the formed article 34 having a final shape.

Hereinafter, examples of the forming die 20 that is used for the forming method according to the present embodiment will be described.

For example, the forming die 20 is a recess die having a recess shape recessed downward, as shown in FIG. 2A. In a case where the formed article 34 having the final shape has an L-shaped cross section, as shown in FIG. 2B, the forming die 20 has a recess shape recessed downward, and has the angle $\theta_1$ that is closer to a flat plane than the bent angle $\theta_0$ of the cross-sectional shape of the formed article 34 to be formed. In the related art, there was a case where a lamination device cannot laminate the fiber sheet 30 with respect to a recess die close to 90 degrees. For example, it is difficult to laminate the tow or the tape in the direction of 45 degrees with respect to a longitudinal direction on the inner surface side of an elongated member having an L-shaped cross section bent at degrees. In contrast, according to the present embodiment, since the bent angle of the forming die 20 is the angle $\theta_1$ which is close to a flat plane, the fiber sheets 30 can be laminated by the lamination device 1. Since the lamination by the lamination device 1 becomes possible, the formed article 34 can be efficiently formed.

Further, the forming die 20 is a protrusion die having a protrusion shape protruding upward, as shown in FIG. 3A. In a case where the formed article 34 having the final shape has a C-shaped cross section, as shown in FIG. 3B, the forming die 20 has a protrusion shape protruding upward, and has the angle $\theta_1$ that is closer to a flat plane than the bent angle $\theta_0$ of the cross-sectional shape of the formed article 34 to be formed. In the related art, in a case where the fiber sheet 30 is laminated with respect to a forming die having a bent angle of 90 degrees, it took time to change the direction of a lamination device and a lamination speed became slow. In contrast, according to the present embodiment, since the bent angle of the forming die 20 is the angle $\theta_1$ which is close to a flat plane, the lamination can be performed at almost the same lamination speed as that in the case of flat lamination without slowing down the lamination speed. Therefore, the formed article 34 can be efficiently formed.

Figure 4A:
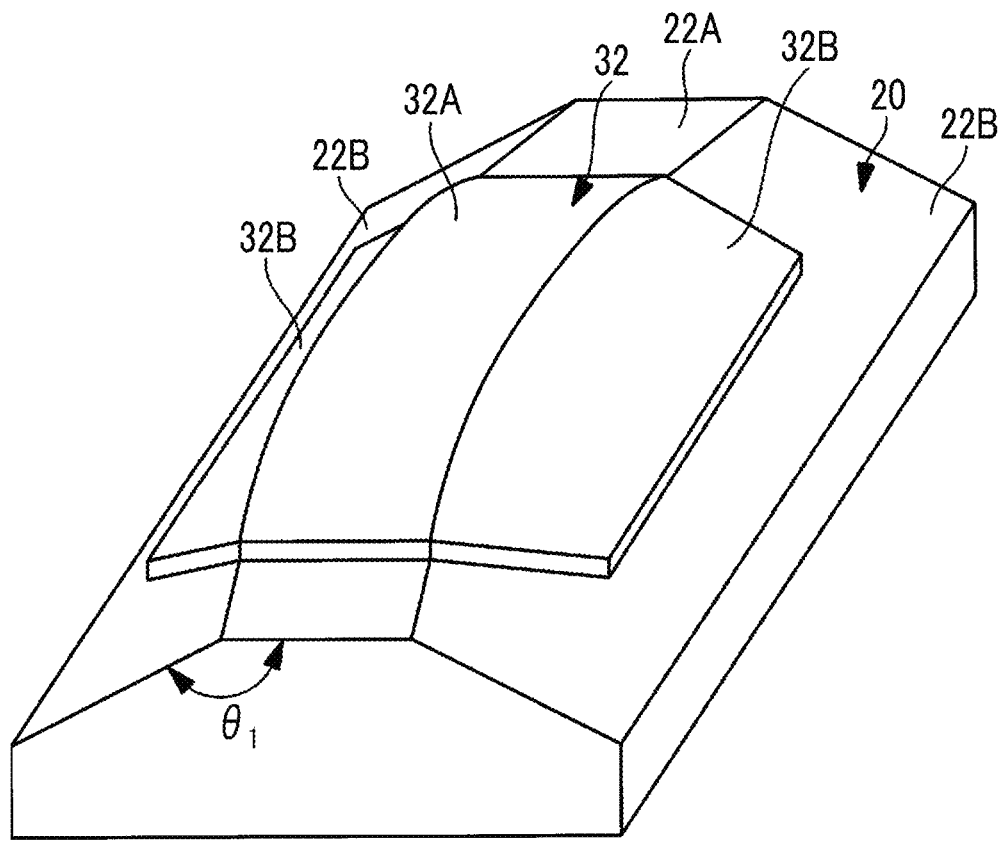
FIG. 4A is a perspective view showing a third example of the forming die according to the embodiment of the present disclosure.
Figure 4B:
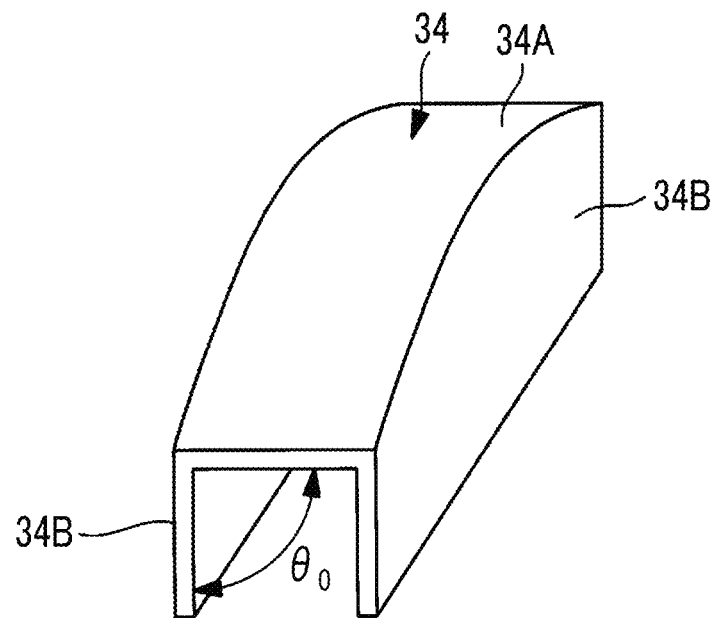
FIG. 4B is a perspective view showing a formed article that is formed by the third example of the forming die according to the embodiment of the present disclosure.
Figure 5A:
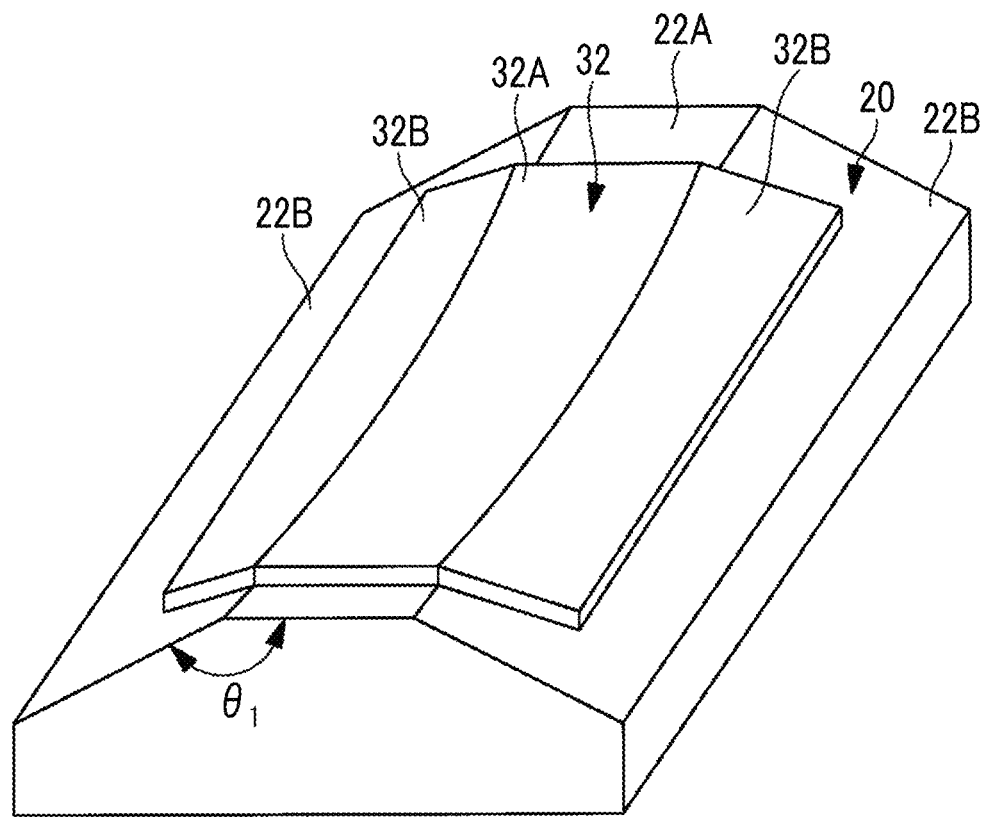
FIG. 5A is a perspective view showing a fourth example of the forming die according to the embodiment of the present disclosure.

Further, the forming die 20 may be a die having a curvature along the longitudinal direction, as shown in FIGS. 4A and 5A. FIG. 4A shows the forming die 20 that is a protrusion die having an upwardly curved curvature in the longitudinal direction. As shown in FIG. 4B, the formed article 34 having the final shape has a C-shaped cross section and has an upwardly curved curvature in the longitudinal direction.

Figure 6:
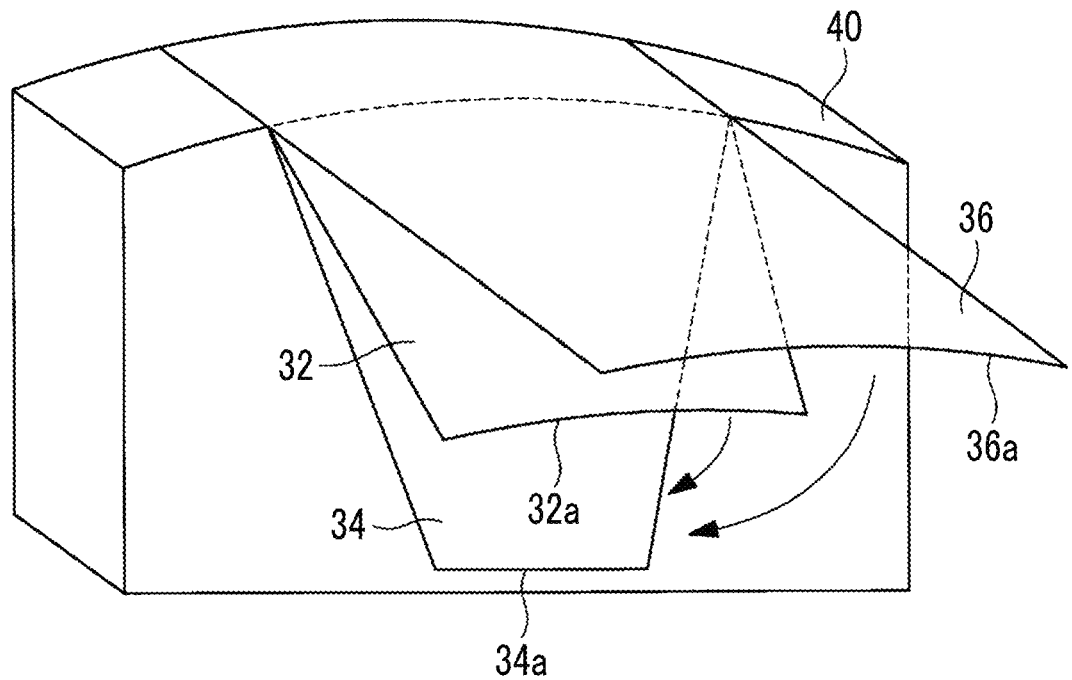
FIG. 6 is a perspective view showing the third example of the forming die according to the embodiment of the present disclosure.

FIG. 6 shows an example of shaping a fiber sheet laminate by using a forming die 40 that is a protrusion die having an upwardly curved curvature in the longitudinal direction and forming the formed article 34. In the method of the related art, the formed article 34 was formed by performing bending on a flat fiber sheet laminate 36 and shaping the fiber sheet laminate 36 along the forming die 40. In contrast, in the forming method according to the present embodiment, the formed article 34 is formed by performing bending on the intermediate formed article 32 and shaping the intermediate formed article 32 along the forming die 40.

As shown in FIG. 6, in a case where the formed article 34 has an upwardly curved curvature in the longitudinal direction, as a result of the bending of bending the flat fiber sheet laminate 36, a difference (a difference in peripheral length) occurs between the length (peripheral length) of an end portion 36a of the fiber sheet laminate 36 before the bending and the length (peripheral length) of an end portion 34a of the formed article 34 which is the fiber sheet laminate after the bending. Since the fibers of the fiber sheet 30 do not have stretchability, in a case where the formed article 34 is curved upward in the longitudinal direction, the fibers of the fiber sheet 30 are compressed in a bending region. As a result, excess fibers cause wrinkles in the fiber sheet 30. In contrast, in a case where bending is performed on the intermediate formed article 32 according to the forming method of the present embodiment, since a difference in peripheral length, which is a difference between the length (peripheral length) of an end portion 32a of the intermediate formed article 32 before the bending and the length (peripheral length) of the end portion 34a of the formed article 34 after the bending, is reduced, excess fibers during forming are reduced, and thus the occurrence of wrinkles can be suppressed.

Figure 5B:
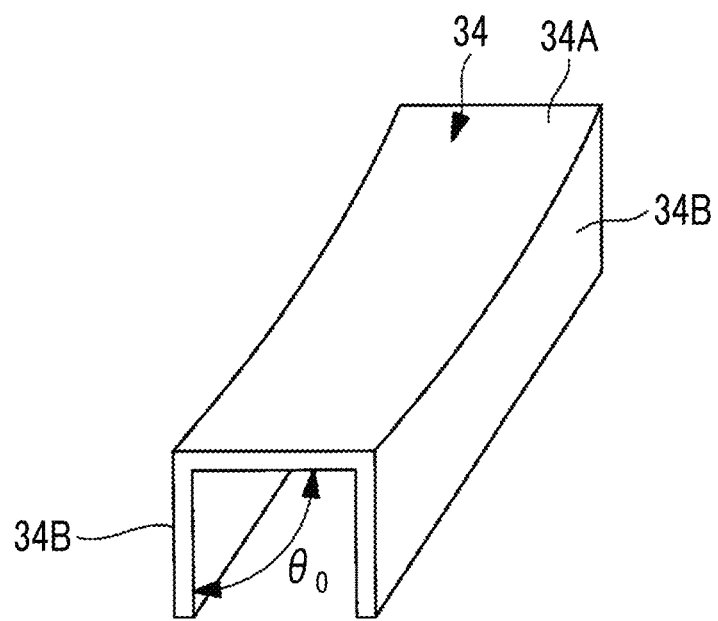
FIG. 5B is a perspective view showing a formed article that is formed by the fourth example of the forming die according to the embodiment of the present disclosure.

FIG. 5A shows the forming die 20 that is a protrusion die having a downwardly curved curvature in the longitudinal direction. As shown in FIG. 5B, the formed article 34 having the final shape has a C-shaped cross section and has a downwardly curved curvature in the longitudinal direction.

Figure 7:
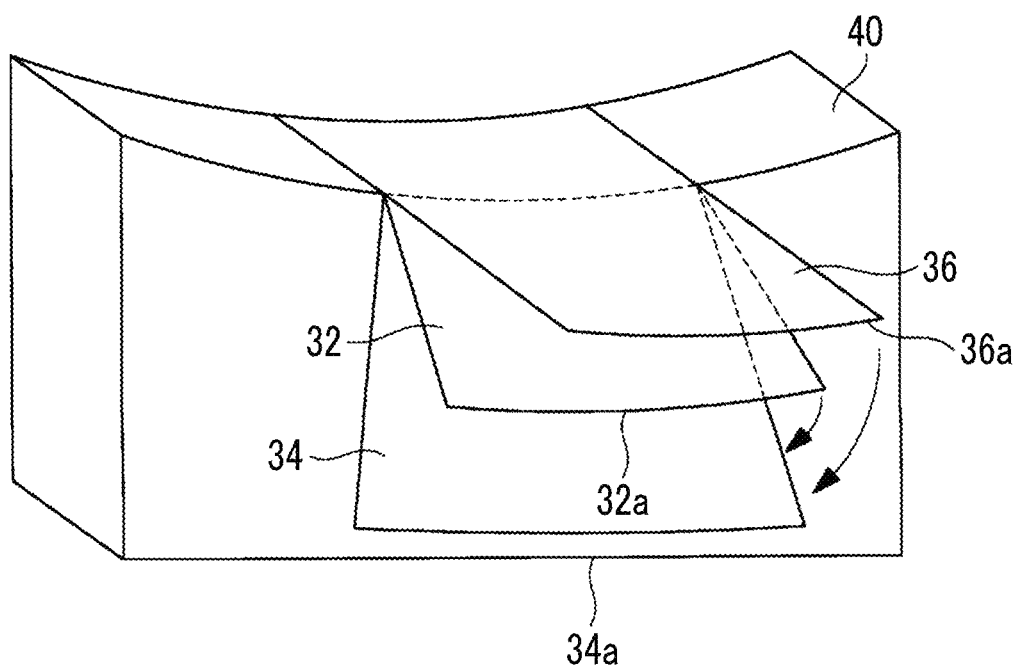
FIG. 7 is a perspective view showing the fourth example of the forming die according to the embodiment of the present disclosure.

FIG. 7 shows an example of shaping a fiber sheet laminate by using the forming die 40 that is a protrusion die having a downwardly curved curvature in the longitudinal direction and forming the formed article 34. In the method of the related art, the formed article 34 was formed by performing bending on a flat fiber sheet laminate 36 and shaping the fiber sheet laminate 36 along the forming die 40. In contrast, in the forming method according to the present embodiment, the formed article 34 is formed by performing bending on the intermediate formed article 32 and shaping the intermediate formed article 32 along the forming die 40.

As shown in FIG. 7, even in a case where the formed article 34 has a downwardly curved curvature in the longitudinal direction, as a result of the bending of bending the flat fiber sheet laminate 36, a difference (a difference in peripheral length) occurs between the length (peripheral length) of the end portion 36a of the fiber sheet laminate 36 before the bending and the length (peripheral length) of the end portion 34a of the formed article 34 which is the fiber sheet laminate after the bending. Since the fibers of the fiber sheet 30 do not have stretchability, in a case where the formed article 34 is curved downward in the longitudinal direction, the fibers of the fiber sheet 30 are pulled in a bending region. As a result, in the portion that receives the most tensile force, the fibers are linearly stretched before the fibers are cut, so that the fibers become excess in the other portion, and the excess fibers cause wrinkles in the fiber sheet 30. In contrast, in a case where bending is performed on the intermediate formed article 32 according to the forming method of the present embodiment, since a difference in peripheral length, which is a difference between the length (peripheral length) of an end portion 32a of the intermediate formed article 32 before the bending and the length (peripheral length) of the end portion 34a of the formed article 34 after the bending, is reduced, excess fibers during forming are reduced, and thus the occurrence of wrinkles can be suppressed.

Figure 9:
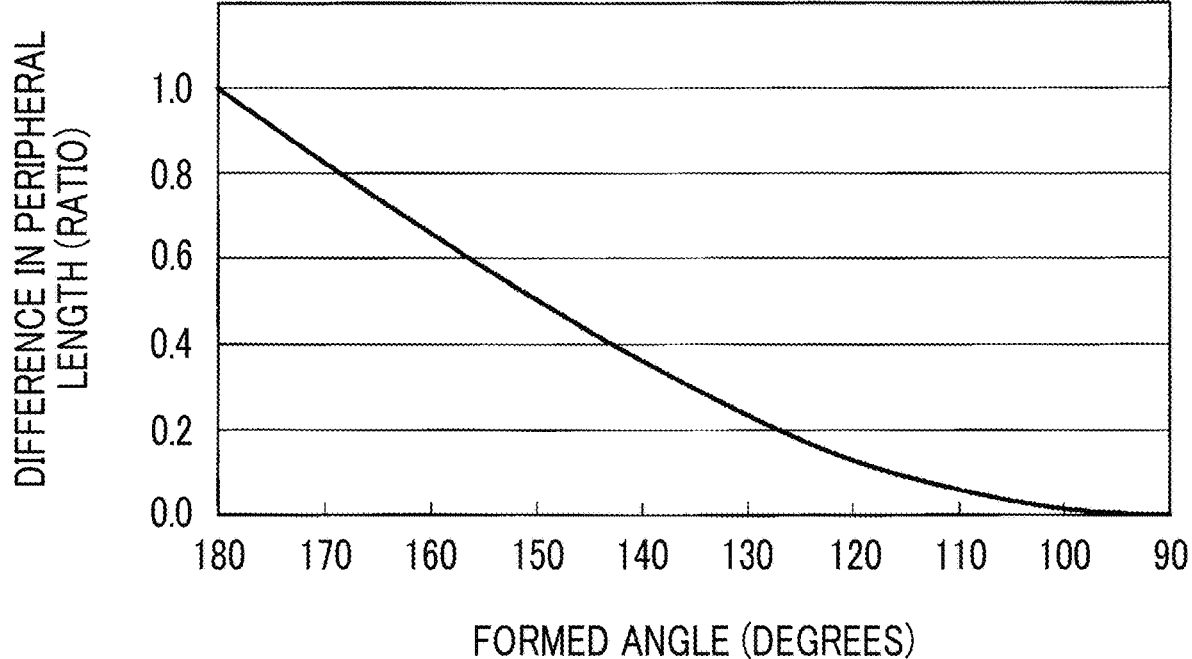
FIG. 9 is a graph showing a relationship between an angle $\theta_1$ that is formed by a forming surface on one side and a forming surface on the other side in a forming die and the ratio of a difference in peripheral length before and after bending.

FIG. 9 shows the relationship between the angle $\theta_1$ that is formed by the forming surface 22A on one side and the forming surface 22B on the other side in the forming die 20 (refer to FIGS. 4A and 5A) and the ratio of the difference in peripheral length before and after the bending. In a case where the formed angle $\theta_1$ is 180 degrees, that is, in a case where the flat fiber sheet laminate 36 is bent without a bent portion in the cross-sectional shape of the forming die 20, the difference in peripheral length is the longest. Then, the difference in peripheral length becomes smaller as the formed angle $\theta_1$ becomes closer to 90 degrees, that is, as it becomes closer to the bent angle $\theta_0$ of the cross-sectional shape of the formed article 34. Therefore, in order to reduce the difference in peripheral length before and after the bending, it is favorable if the angle $\theta_1$ that is formed by the forming surface 22A on one side and the forming surface 22B on the other side in the forming die 20 is reduced to be closer to the bent angle $\theta_0$ of the cross-sectional shape of the formed article 34.

As described above, according to the present embodiment, the bent angle of the cross-sectional shape of the intermediate formed article 32 that is formed by the forming die 20 is larger than the bent angle $\theta_0$ of the cross-sectional shape of the formed article 34 to be finally formed and is less than 180 degrees. Then, bending is performed on the fiber sheet 30 which is laminated on the forming die 20 and formed into a shape corresponding to the forming die 20, that is, the intermediate formed article 32, so as to obtain the formed article 34. In this way, the amount of interlayer slip that is generated is reduced as compared with a case where bending is performed on the flat fiber sheet 30 so as to obtain the formed article 34.

Further, in a case where the angle $\theta_1$ that is formed by the forming surface 22A on one side and the forming surface 22B on the other side in the forming die 20 is, for example, 120 degrees or more, more preferably 160 degrees or more, it is possible to laminate the fiber sheets 30 with a wide tow or tape when laminating the fiber sheet 30. As a result, a time required for lamination can be shortened.

Figure 8A:
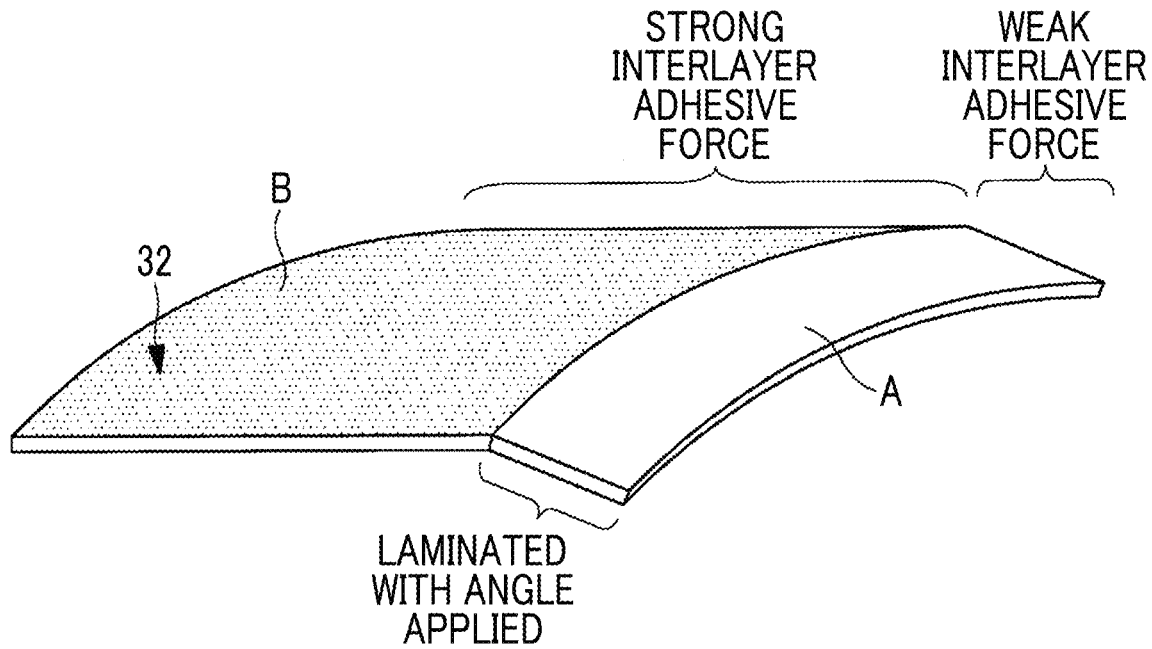
FIG. 8A is a perspective view showing an intermediate formed article that is formed by a modification example of a forming method according to the embodiment of the present disclosure.
Figure 8B:
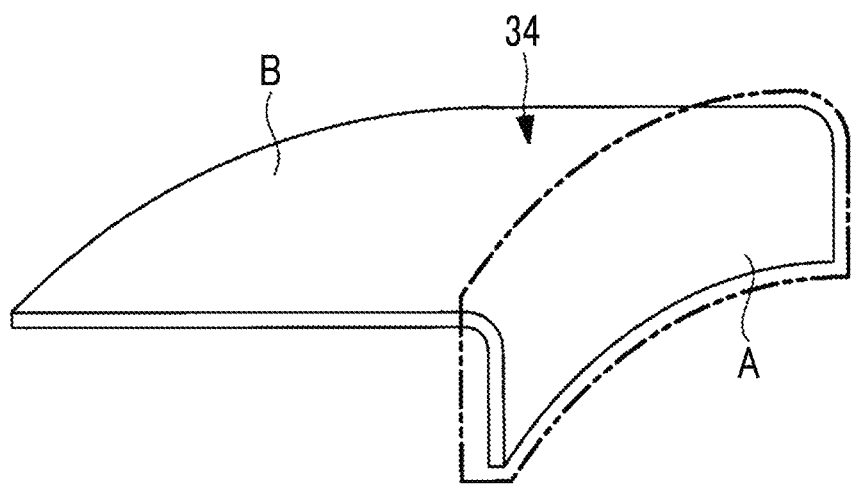
FIG. 8B is a perspective view showing a formed article that is formed by the modification example of the forming method according to the embodiment of the present disclosure.

In the embodiment described above, a case where the interlayer adhesive force between the layers of the intermediate formed article 32, which is a fiber sheet laminate, is constant regardless of a bending region and another non-bending region has been described. However, the present disclosure is not limited to this example. FIG. 8A shows the intermediate formed article 32, and FIG. 8B shows the formed article 34 formed by performing bending on the intermediate formed article 32 shown in FIG. 8A. In a step of laminating the fiber sheets 30 to form the intermediate formed article 32, as shown in FIG. 8A, the interlayer adhesive force of a non-bending region B other than a bending region (forming area) A where bending is performed is adjusted so as to become higher than the interlayer adhesive force of the bending region A. That is, in the bending region A, the interlayer adhesive force is weakened, and in the non-bending region B, the interlayer adhesive force is strengthened.

In this way, during the bending, an interlayer slip is easily generated appropriately in the bending region A, so that the forming property is improved. As a result, as shown in FIG. 8B, the occurrence of wrinkles can be suppressed in the bending region A of the formed article 34. Further, in the non-bending region B having a relatively high interlayer adhesive force, peeling of the fiber sheet 30 that occurs at the time of lamination can be prevented, so that the laminating property is improved. Further, in the non-bending region B where the interlayer adhesive force is relatively high, interlayer peeling at the time of handling can be prevented, so that the handling property is improved.

The forming method described in the embodiment described above is grasped as follows, for example.

The forming method according to the present disclosure includes a laminating step of supplying and laminating fiber sheets (30) on a forming surface (22A, 22B) of a forming die (20) for forming an intermediate formed article (32) to form the intermediate formed article, and a bending step of performing bending on the intermediate formed article, which is laminated on the forming surface and has a shape corresponding to the forming die, so as to obtain a formed article (34), in which the forming surface has a shape corresponding to the intermediate formed article to be formed, a second forming surface (22B) is bent with respect to a first forming surface (22A) in the forming surface, and an angle that is formed by the first forming surface and the second forming surface is larger than a bent angle of a cross-sectional shape of the formed article to be formed and is less than 180 degrees.

According to this configuration, the fiber sheets are supplied and laminated on the forming surface of the forming die for forming the intermediate formed article. The forming surface has a shape corresponding to the intermediate formed article to be formed, the second forming surface is bent with respect to the first forming surface in the forming surface, and the angle that is formed by the first forming surface and the second forming surface is larger than the bent angle of the cross-sectional shape of the formed article to be formed and is less than 180 degrees. In this way, the intermediate formed article having a bent angle larger than the bent angle of the cross-sectional shape of the formed article is formed. Then, bending is performed on the fiber sheets laminated on the forming die and formed into a shape corresponding to the forming die, that is, the intermediate formed article, so as to obtain the formed article. In this way, the amount of interlayer slip that is generated is reduced as compared with a case where bending is performed on a flat fiber sheet so as to obtain a formed article.

The forming die can be applied to either a case of being a recess die having a recess shape recessed downward or a case of being a protrusion die having a protrusion shape protruding upward.

In the forming method according to the present disclosure, the forming die may have a curvature in a direction intersecting a cut surface that includes the cross-sectional shape.

According to this configuration, the intermediate formed article formed into a shape corresponding to the forming die has a curvature in the direction intersecting the cut surface that includes the cross-sectional shape. In a case of having a curvature in the direction intersecting the cut surface that includes the cross-sectional shape, when bending is performed on a flat fiber sheet so as to obtain a formed article, since a difference in peripheral length occurs in the fiber sheet before and after the bending, so that a compressive force or a tensile force is applied, and thus wrinkles occur. In contrast, in a case where bending is performed on the intermediate formed article so as to obtain the formed article, since the difference in peripheral length that is generated is reduced as compared with a flat fiber sheet, the compressive force or tensile force that is applied is also reduced. Therefore, the occurrence of wrinkles due to the bending is suppressed.

In the forming method according to the present disclosure, the forming method may further include an adjusting step of adjusting an interlayer adhesive force that is applied to the laminated fiber sheets, and in the adjusting step, the interlayer adhesive force may be adjusted such that the interlayer adhesive force of the non-bending region other than the bending region where bending is performed in the fiber sheets becomes higher than the interlayer adhesive force of the bending region.

According to this configuration, the interlayer adhesive force that is applied to the laminated fiber sheets is adjusted. Further, the fiber sheets are laminated such that the interlayer adhesive force of the non-bending region other than the bending region where bending is performed in the fiber sheets is higher than the interlayer adhesive force of the bending region. In this way, the interlayer adhesive force in the bending region is relatively low, so that the layers can be appropriately slid with respect to one another during the bending, and thus the occurrence of wrinkles can be suppressed. Further, in the non-bending region where the interlayer adhesive force is relatively high, peeling at the time of lamination or handling can be prevented.

In the forming method according to the present disclosure, the formed article has a first plate portion (34A) and a second plate portion (34B) connected to the first plate portion, and the bent angle of the cross-sectional shape of the formed article is an angle that is formed by the plate surface of the first plate portion and the plate surface of the second plate portion.

A forming die according to the present disclosure is a forming die for forming an intermediate formed article that is subjected to bending to be formed as a formed article, in which the forming die has a forming surface on which fiber sheets are supplied and laminated, the forming surface has a shape corresponding to the intermediate formed article to be formed, a second forming surface is bent with respect to a first forming surface in the forming surface, and an angle that is formed by the first forming surface and the second forming surface is larger than a bent angle of a cross-sectional shape of the formed article to be formed and is less than 180 degrees.

The forming die according to the present disclosure is a recess die having a recess shape recessed downward.

The forming die according to the present disclosure is a protrusion die having a protrusion shape protruding upward.

REFERENCE SIGNS LIST

1: lamination device
2: supply unit
3: pressing unit
4, 5: heating unit
20: forming die
22A: forming surface (first forming surface)
22B: forming surface (second forming surface)
30: fiber sheet
32: Intermediate formed article
32A: first plate portion
32B: second plate portion
34: formed article
34A: first plate portion
34B: second plate portion
36: fiber sheet laminate
40: forming die
A: bending region
B: non-bending region

The invention claimed is:

1. A forming method comprising:
a laminating step of supplying and laminating fiber sheets on a forming surface of a forming die for forming an intermediate formed article to form the intermediate formed article; and
a bending step of performing bending on the intermediate formed article, which is laminated on the forming surface and has a shape corresponding to the forming die, so as to obtain a formed article,
wherein the forming surface has a shape corresponding to the intermediate formed article to be formed,
a second forming surface is bent with respect to a first forming surface in the forming surface, and an angle that is formed by the first forming surface and the second forming surface is larger than a bent angle of a cross-sectional shape of the formed article to be formed and is less than 180 degrees,
the second forming surface is in contact with a bending region where bending is performed in the bending step,
the first forming surface is in contact with a non-bending region other than the bending region, and
the first forming surface of the forming die has a curvature in a direction intersecting a cut surface that includes the cross-sectional shape.

2. The forming method according to claim 1, further comprising:
an adjusting step of adjusting an interlayer adhesive force that is applied to the laminated fiber sheets,
wherein in the adjusting step, the interlayer adhesive force is adjusted such that the interlayer adhesive force of a non-bending region other than a bending region where bending is performed in the fiber sheets is higher than the interlayer adhesive force of the bending region.

3. The forming method according to claim 1, wherein the formed article has a first plate portion and a second plate portion connected to the first plate portion, and the bent angle of the cross-sectional shape of the formed article is an angle that is formed by a plate surface of the first plate portion and a plate surface of the second plate portion.

* * * * *